(12) United States Patent
Stuart

(10) Patent No.: US 6,311,465 B1
(45) Date of Patent: Nov. 6, 2001

(54) BUNDLING RAKE

(76) Inventor: Thomas I. Stuart, 267 St. Andrews Street, Cambridge, Ontario (CA), N1S 1N9

( * ) Notice: Subject to any disclaimer, the term of this patent is extended or adjusted under 35 U.S.C. 154(b) by 0 days.

(21) Appl. No.: 09/392,551

(22) Filed: Sep. 9, 1999

Related U.S. Application Data

(63) Continuation-in-part of application No. 08/947,438, filed on Oct. 8, 1997, now abandoned.

(51) Int. Cl.$^7$ ........................................................ A01D 7/10
(52) U.S. Cl. ........................................................ 56/400.12
(58) Field of Search ........................... 56/400.01, 400.04, 56/400.12, 400.16, 400.17, 400.18, 400.19, 400.2; 294/50.8, 50.9, 50.5

(56) References Cited

U.S. PATENT DOCUMENTS

| | | |
|---|---|---|
| Re. 33,702 | 10/1991 | Allen . |
| 2,797,544 | 7/1957 | Fite . |
| 4,545,189 | 10/1985 | Nelson . |
| 5,058,370 | 10/1991 | Russell . |
| 5,414,982 | 5/1995 | Darnell . |
| 5,440,868 | 8/1995 | Darnell . |

*Primary Examiner*—Robert E. Pezzuto
(74) *Attorney, Agent, or Firm*—R. Craig Armstrong

(57) ABSTRACT

A rake for raking and gripping debris having an elongate handle, a rake head and a pivotable debris collection device. The rake head has a plurality of tines and is fixedly attached to one end of the elongate handle. The pivotable debris collection device is in the form of a grapple attached to and pivotable about a fulcrum axis attached to the rake head. An elongate string is attached to the rake head at one end and to a grip slidingly arranged on the elongate handle at the other end. Further, a biasing device urges the grapple towards an open position, where the grapple is pivoted away from the rake head tines. The rake has, a pulley to multiply the force which is applied to the grapple from the grip via the elongate string.

12 Claims, 4 Drawing Sheets

BUNDLING RAKE

REFERENCE TO RELATED APPLICATION

This application is a continuation-in-part of application Ser. No. 08/947,438 filed Oct. 8, 1997, now abandoned.

BACKGROUND OF THE INVENTION

1. Field of the Invention

This invention relates to gardening tools, and in particular to a lawn rake with a debris collection means, to facilitate the collecting and holding of, for instance, leaves or cut grass.

2. Description of the Prior Art

A variety of lawn rakes and similar tools, having bundling capacity, are known. Different designs of lever systems are used, for example in U.S. Pat. No. 5,058,370 (Russell), U.S. Pat. No. 4,545,189 (Nelson), U.S. Pat. No. 2,797,544 (Fite), U.S. Pat. No. 2,504,943 (Zifferer), U.S. Pat. No. 2,891,374 (Richmond), U.S. Pat. No. 2,908,131 (Ross), U.S. Pat. No. 5,058,370 (Russell), U.S. Pat. No. 2,790,296 (Bernstein) and U.S. Pat. No. 5,303,536 (Tolliver). All these designs share the drawback of being relatively heavy to operate, i.e. the lever action upon the bundling element is heavy and requires the user of the garden tool to exert an unnecessarily high force on the lever system, to accomplish the bundling action. A further design of a garden tool, solely used for picking up already raked leaf piles, is described in U.S. Pat. No. 4,848,074 and U.S. Pat. No. RE 33,702 (Allen). The head of the device has a plurality of tines, pivotably connected to a base portion of the head and interconnected so that if one tine is pivoted, all the others follow the motion. The tines are arranged in a circular manner around a hollow handle. A cable, which runs inside the handle and is attached to a manipulating lever on the handle at one end, and attached to one of the tines at the other end, is used to uniformly move the tines inwardly in unison when the lever pulls the cable. The circular arrangement of the tines makes it extremely difficult to actually use this garden tool as a rake, it is suited primarily for bundling and picking-up leaves.

In the majority, there are three significant methods in the design of debris collecting rakes and rake like devices; U.S. Pat. No. 2,504,943, to Zifferer, is typical of the radial pivot to clutch method, whereas U.S. Pat. No. 2,790,296, to Bernstein is typical of the transverse pivot to clutch method.

The transverse method being an attempt to remove the need for a second articulating rake head which is commonly both heavy and difficult to position, whereas the radial method by reason of expectation may have greater capacity.

The third method being the circumferential clutch method described in U.S. Pat. No. Re.33,702, to Allen.

The aforementioned difficulty in applying force to an articulating rake head using levers, necessitates a combination of linkages and fulcrums of greater mechanical advantage than can be applied to a standard hand rake, to apply sufficient force and control to achieve the desired degree of utility. A combination of linkages for articulating a rake head is disclosed in U.S. Pat. No. 4,545,189 to Nelson, whereby the force is applied using a long thin rod placed in the harder to control centre of compression stress, rather than in the more preferential form of tension. The rod is acting on a lever of the third order at an angle that would apply negligible force to the distal end of the rake head during the last quadrant of rotation where it is most needed to clutch the debris. The method of using an additional lever of the second order to increase the mechanical advantage often seemingly fails to provide a product that gains the consumer's satisfaction.

In U.S. Pat. No. 2,797,544 to Fite and U.S. Pat. No. 2,891,374 to Richmond, both describe attempts to hide the large lever in a through the handle mount which may weaken the handle's resistance to stress beyond a reliable point.

U.S. Pat. No. 2,504,943 to Zifferer, describes a light weight grapple, in the form of an arcuate brace as sufficient means to grasp laminated debris, whereas the majority of prior art describe heavy debris collecting rakes, which suffer from ergonomic and mechanical limitations. The resulting force at the grapple is not constant and almost nullified during the last quadrant of rotation where the greatest amount of force is needed and whereby friction, return springs and massive components have consumed the majority of the applied force, making rakes and rake like devices of this type heavy and unwieldy.

SUMMARY OF THE INVENTION

It is an object of the invention to mitigate and/or obviate the above mentioned disadvantages to provide a rake having a collection means attached to the head of the rake. The collection means is light, but will provide sufficient force to hold a grapple securely and tightly pressed towards the tines of the rake, to hold the raked debris, without the user of the rake having to exert excessive force on the rake mechanism or the rake handle.

It is a purpose of the invention to provide an pulley system beyond that of a simple sheave to provide the needed force.

The past state of the art has relied upon lever principles as force amplification elements, whereas, the present invention describes a reeve of pulley elements able to provide the necessary utility whereby the preferred embodiment of the invention combines force multiplying pulleys and levers in a recondite and reliable form, for applying forcible clutching, grasping and compressive action to a debris collecting apparatus.

It is a further purpose of the invention to apply the greatest amount of force by the simplest, most efficient means using tension, thereby allowing the use of light weight, inexpensive flexible elements, reeved through pulleys and integrated mechanical elements. Whereas many pulley combinations are possible, the present invention prefers to transmit, change direction and multiply the force using a minimum of pulley components integrated into a pivotal grapple as a means of force amplification and to achieve efficient debris pile collection.

Sufficient force can be supplied to a grapple of the collection means using a modified "fixed and runner" pulley combination, also called a "gun tackle purchase", whereby a fixed pulley is located on an axis of a lever, the axis also being the fulcrum of the grapple and a moving runner pulley is located between the fulcrum and the anticipated point of loading, thereby describing a lever of the "third order" integrated to form the pivoting grapple and further collection means.

The reeve of a flexible element, such as a band, cord, rope or string, translates from the fixed pulley, commonly called a "sheave", to redirect force and thereby avoiding force vectors common in applying force to levers, to a fixed point of the grapple. The fixed point is further improved being modified as the aforesaid runner pulley position, whereby the translation of force is further improved according to the "law of the pulley" whereby the flexible element is anchored to the rake embodiment according to the common formula $W=P*n$ wherein W is the resulting force, P is the applied force and n is the number of strands thereby amplifying the force applied to the third order lever forming a more powerful clutching means.

It is a further purpose of the invention to prevent overrun or dislocation of the flexible element, whereby the fixed pulley has a shroud located on the axis. The shroud may rotate concentrically to the fulcrum axis and the fixed pulley. The shroud preferably has tabs to act as engaging points to start or stop the shroud rotation.

It is a further purpose of the invention to prevent overrun or dislocation of the flexible element, caused by limpidity, i.e. insufficient tension of the flexible element. Friction sufficient to latch the flexible element within the circumferential groove of a pulley, is found in the elastic properties of the interacting elements, whereby the circumferential opening of the pulley groove is of lesser total width than the circumferential root or bottom width of the pulley groove.

Yet a further purpose of the invention is to prevent overrun or dislocation of the flexible element, whereby the circumferential periphery of one pulley enters into the rope guide or slot of the complementary pulley so that the pulleys may rotate continuously proximate.

It is also a purpose of the invention to prevent overrun or dislocation of the flexible elements, whereby the slot of the runner pulley rope guide may be enlarged, or configured in a helix, whereby the rope emergence towards an anchor point facilitates a linear transition. The pulleys may also be made of material having low friction surfaces, so that the reeve of the flexible element provides a further enhanced amplification of the applied force by minimizing friction losses.

Still a further purpose of the invention is to utilize the helical turn of the tine stiffener torsion spring, of known rakes, as the pivot point of the debris collection means. In order to retract the collection means, an elastomer element is preferred being both light in weight and of low cost. In a preferred embodiment, the elastomer cord is interposed through the collection means in a loop, having elongated extensions mechanically held by retaining means obvious to those experienced in the art.

It is also a purpose of the invention to provide moulded bearing points, thereby capturing the band, cord, rope or flexible elements obviating the need for pulleys to rotate continuously proximate a circumferential slot, as the method of providing a reeve guide.

It is a further object of the invention to utilize the helical turn on each arm of the tine stiffener torsion spring as a bearing point and to utilize an elastic and resilient element, preferably a looped elastomer biasing means, as a means of locating the grapple assembly as a floating anti-vibrational unit.

In the invention, a rake for raking and gripping debris comprises an elongate handle, a rake head, a pivotable debris collection means, an elongate string means, a biasing means and pulley means. The rake head has a plurality of tines and is fixedly attached to one end of the elongate handle. The pivotable debris collection means is in the form of a grapple, attached to and pivotable about a fulcrum axis means attached to the rake head. The elongate string means is attached to the rake head at one end and to a grip slidingly arranged on the elongate handle, at the other end. The biasing means urges the grapple towards an open position, where the grapple is pivoted away from the rake head tines. The pulley means are attached to the rake, to multiply the force which is applied from the grip to the grapple via the elongate string means. The pulley means are attached either to the rake head or the rake handle/grip.

The pulley means preferably comprises a fixed pulley and a movable pulley, the fixed pulley being rotatably attached to the rake head and rotatable around the fulcrum axis means, and the movable pulley being fixedly attached to the grapple. The elongate string means is run from the grip, over the movable pulley, around the fixed pulley, and to the rake head at a position close to the free end of the tines.

In one embodiment of the invention, the fulcrum is the windings of a torsional stiffener spring for the rake tines. Alternatively, the fulcrum axis means are two bearing elements arranged on the rake head.

In one preferred embodiment, the grapple biasing means is a flexible rope.

In one preferred embodiment, the elongate string means is a flexible rope.

According to yet another preferred embodiment, the fixed pulley is substantially covered by a shroud, to prevent the elongate string means from binding and/or overrunning/dislocating from the fixed pulley.

In a further embodiment, the fixed pulley has a groove with a wider bottom portion than top portion, to prevent the elongate string means from binding and/or overrunning/dislocating from the fixed pulley.

In yet a further embodiment, the movable pulley is mounted on a rigid brace attached to the grapple, and the movable pulley has two opposing large diameter sleeves providing a slot acting as a guide for the elongate string means.

The grip preferably has an annular ring, serving as a hand guard, and a cavity for hiding the elongate string means and at the same tine provide an anchoring point for the elongate string means, and wherein a guide means, attached to the rake handle, cooperates with one or more co-linear slots in the grip, to maintain a rectilinear motion of the grip along the handle.

The action of the elements added to the known rake, requires reinforcement of the handle receiving socket, whereby an increase in the number, width and length of transverse ribs is needed on the socket dome to prevent longitudinal splitting of the preferred plastic material. This is also a problem with conventional rakes made using polypropylene plastics.

The dynamic action or static loading on the hand rake elements of plastic or composite construction, may be reinforced at a handle receiving socket with an increase in the number, width and length of transverse ribs on the socket dome or rib number, length or width at anchor points of the retractor and pulleys, both rotational and non-rotational. Additional reinforcement and guide of the flexible elements may be provided, whereby an enclosed tube may be formed or the flexible elements may be run in a hollow handle.

In order to retract the grapple, a biasing means, acting as a return spring, is preferred being both light in weight and low in cost. The biasing means is preferably made of an elastomer.

The biasing means may be mounted in many ways known to those experienced in the art, whereby the strain of the elastomer is reduced by a reduction in the mechanical moment as the lever/grapple rotates around the fulcrum.

The present invention can also benefit from the use of a hollow handle, where additional tooling costs are not restrictive. Furthermore, many variation of means for rope guides, rope anchors and tine clamp access and egress are possible.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
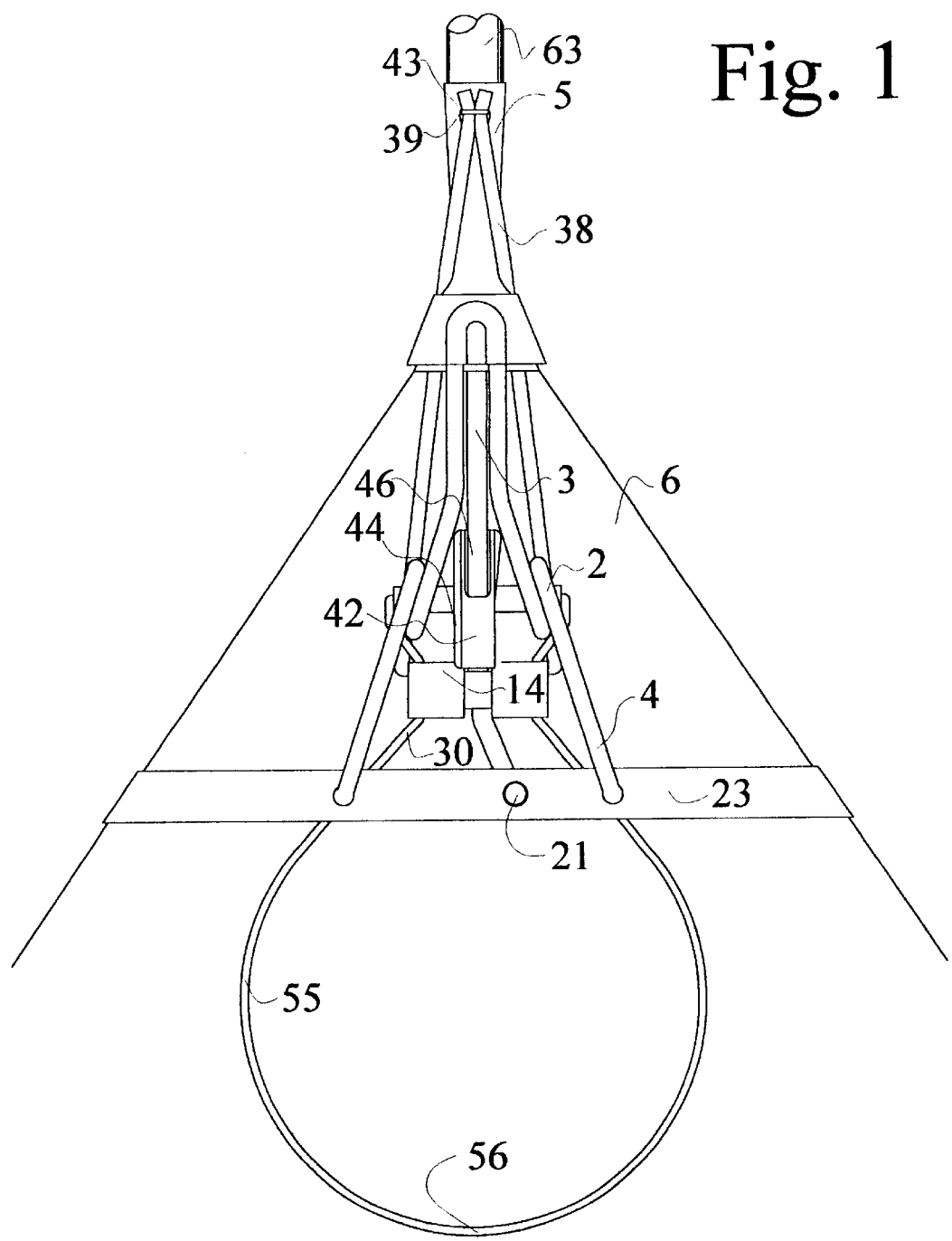
FIG. 1 is a plan view of a first embodiment of a rake according to the invention.

FIG. 1 illustrates a first embodiment of the invention. A pivotable grapple 30 has a fulcrum 2, which preferably is the helical turn of a torsional stiffener spring 4 of a metal tined lawn rake 6.

Figure 2:
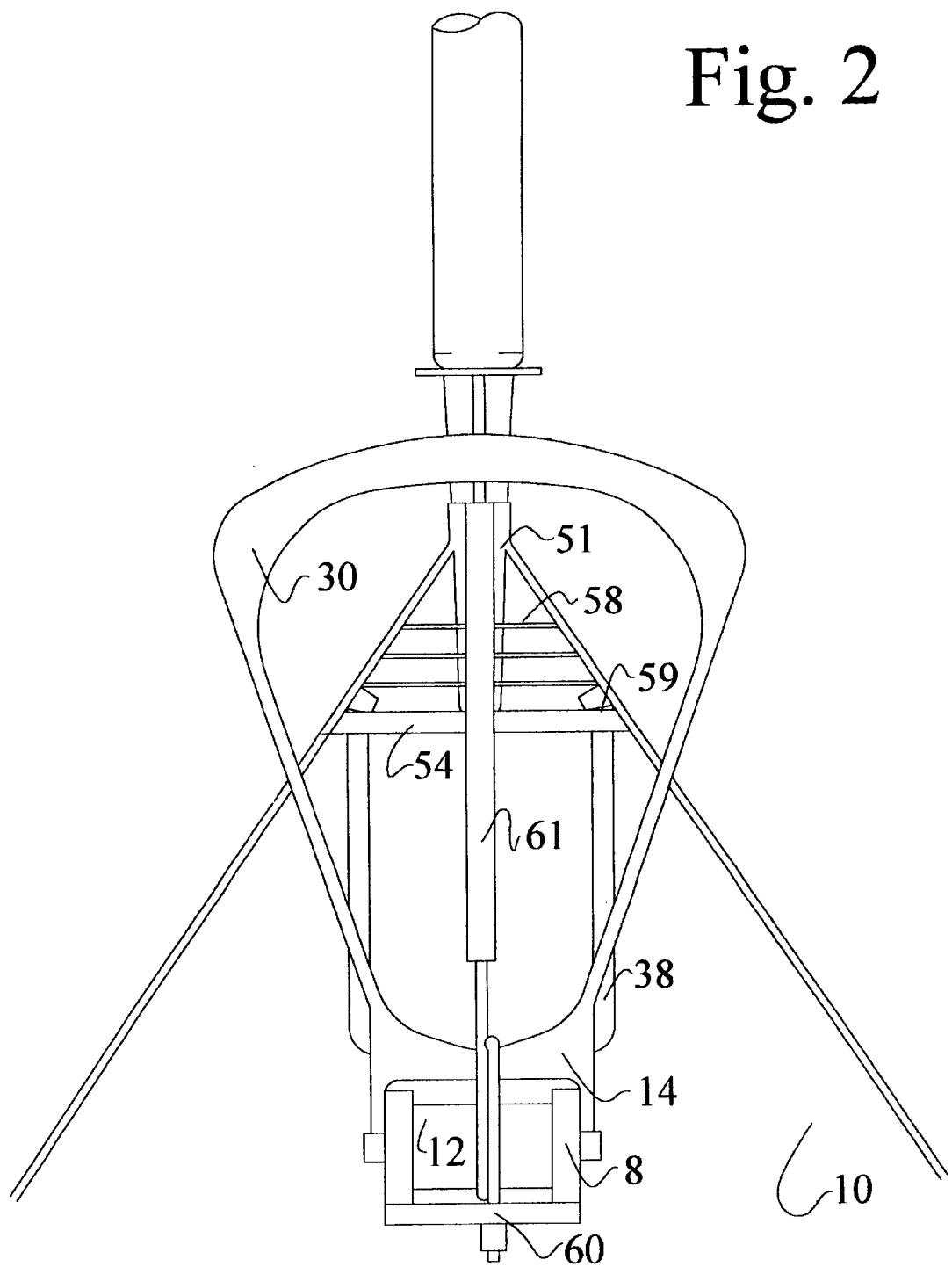
FIG. 2 is a plan view of a second embodiment of a rake according to the invention.

A second embodiment of the invention is shown in FIG. 2. The fulcrum is provided by bearings 8, which are part of a plastic rake 10.

Figure 3:
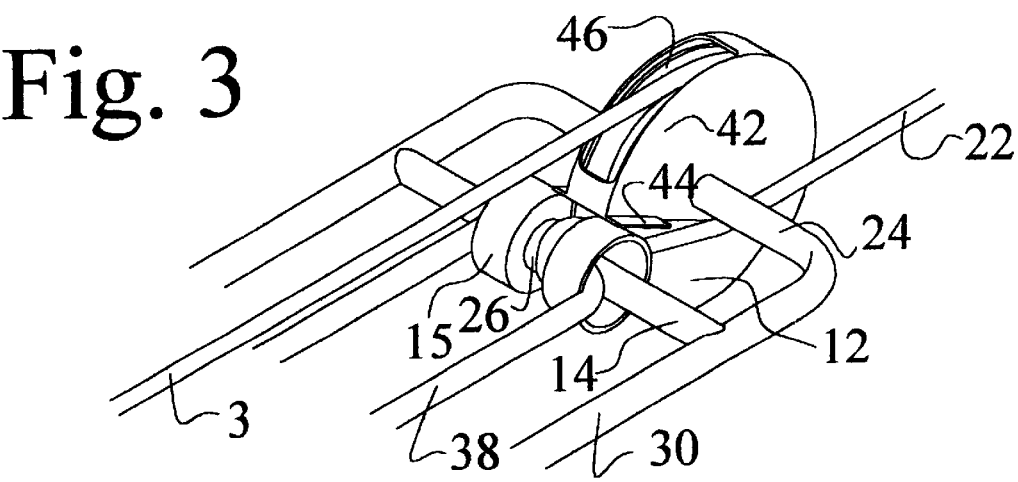
FIG. 3 is an elevational side view of the pulley mechanism according to the first embodiment of the invention.

FIG. 3 illustrates one embodiment of the preferred features of the grapple 30, wherein a pivotal fulcrum axis 24 supports the terminating extensions of the grapple, to form a unitary lever. The fixed pulley 12, is preferably free to rotate on the fulcrum axis 24 or an affixed low friction surface.

Figure 9:
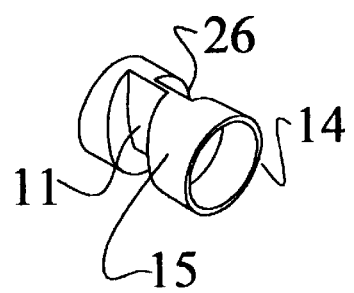
FIG. 9 is an elevational side view of a movable pulley according to a further embodiment of the invention.

In FIG. 3, one embodiment of the movable pulley 14 comprises a rigid brace, attached on the parallel extensions of the grapple 30. Two opposing sleeves 15 of larger diameter are arranged on the rigid brace, to provide a slot 26 acting as a reeve guide, to accept the mating outside radius of the fixed pulley 12, thereby preventing the flexible element 3 to overrun. To guide the exit of the reeve towards the anchor point 22, the opposing sleeves 15 may be formed integrally with the rigid brace, to form a helical slot 11 as shown in FIG. 9. A further embodiment of the movable pulley 14, as shown in FIG. 2, is configured without sleeves, whereby the bearings 8 of the fixed pulley 12 prevent rope overrun. The runner pulley or the fixed pulley may be constructed to revolve using methods common to those experienced in the arts or where preferred, a low friction surface of irregular curvature may be constructed integral with the grapple 30 or head 10 using composite materials.

Figure 4:
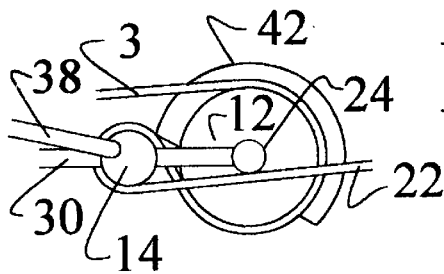
FIG. 4 is a side view of the pulley mechanism according to FIG. 3, showing the grapple in its resting position.
Figure 5:
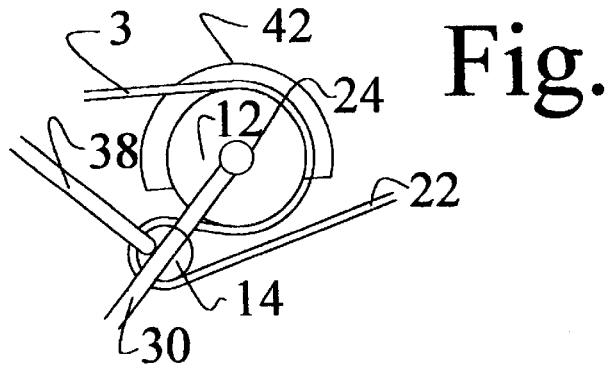
FIG. 5 is a side view of the pulley mechanism according to FIG. 3, showing the grapple in an intermediate position.
Figure 6:
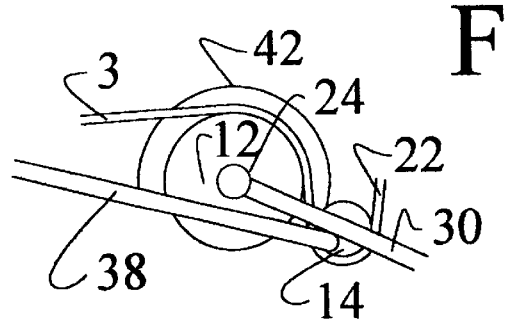
FIG. 6 is a side view of the pulley mechanism according to FIG. 3, showing the grapple in its debris gripping position.
Figure 10:
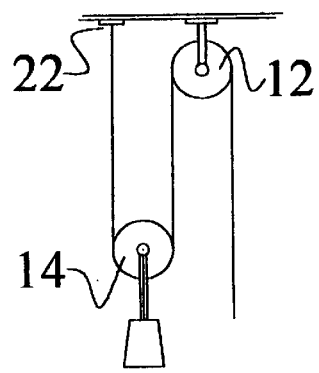
FIG. 10 is a side view of the principle pulley arrangement according to the invention.

FIGS. 4, 5 and 6 show a side view of the pulley elements, according the invention, constituting a pulley combination typified as a "gun tackle purchase" or "fixed and runner", although any combination of pulleys could be used. FIG. 10 shows the principle pulley arrangement. The fixed pulley 12 is located on a lever/grapple 30 having a fulcrum axis 24, typified as a "lever of the third order". FIG. 4 shows the pulley arrangement in its retracted position. The fixed pulley 12 and the movable pulley 14 cooperate to provide a fixed and runner pulley system. The fulcrum axis 24 co-acts with the grapple 30, thereby forming a lever arm. The applied force of a rope 3, is acting through the reeve, increasing the reacting force according to the diameter of pulleys 12 and 14. The rope 3 is fastened to the rake 6 at a position close to the rake end of the tines, thus forming an anchorage 22.

FIG. 1, illustrates a means of rope anchorage to the tine spreader bar 23, whereby a hole 21, cavity or means suitable to the variety of said tine spreader bar design, allows concealment of the rope attachment.

Figure 7:
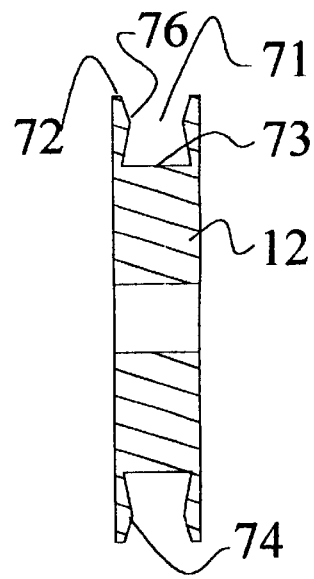
FIG. 7 is a sectional view of a fixed pulley according to one embodiment of the invention.

FIG. 7 illustrates preferred features of the fixed pulley 12 having a rope latching feature comprising a circumferential slot 71 having two side walls 72. The slot further has width reducing means 74, for example knobs, embossments or angular relief on one sidewall or both. The circumferential slot thus causes elastic compression of the rope 3 to be reduced at a root or bottom of the slot 73. The outward facing surface of the width reducing means 74 may be sloped 76 where preferred, to control the entry and exit of the rope 3.

The grapple 30 is biased towards a resting position, where the grapple is held folded back towards the handle of the rake by a biasing means 38. FIG. 3 shows the biasing means run through an aperture on the grapple assembly and having the distal end attached with, for example, a metal staple 39 (FIG. 1), through a hole 43 located in a handle socket 5, or by any means common to those experience in the art.

A shroud 42 acts as a rope guide, having an elongated forward opening 46 to prevent binding of the flexible element. The shroud is free to rotate coaxially with the fixed pulley 12. The shroud preferably extends to cover the fixed pulley 12 as much as possible, and preferably has projections 44, to contact the grapple and tines, thereby starting and stopping the rotation.

FIG. 1 illustrates one embodiment of the grapple 30, having circumferential and parallel extensions 55, formed at an angle thereby creating a lip 56 of a jaw, to improve grasping of the refuse. Other means common to those experienced in the art may be used to optimize the gripping capability of the grapple.

A light weight yet functional grapple 30 may be fabricated in plastic or as a combination of plastic and metal to suit economy considerations, or manufacturing machinery with integral runners and guides, or assembled parts for preferred material properties or to more closely resemble preferred rake head elements.

Figure 8:
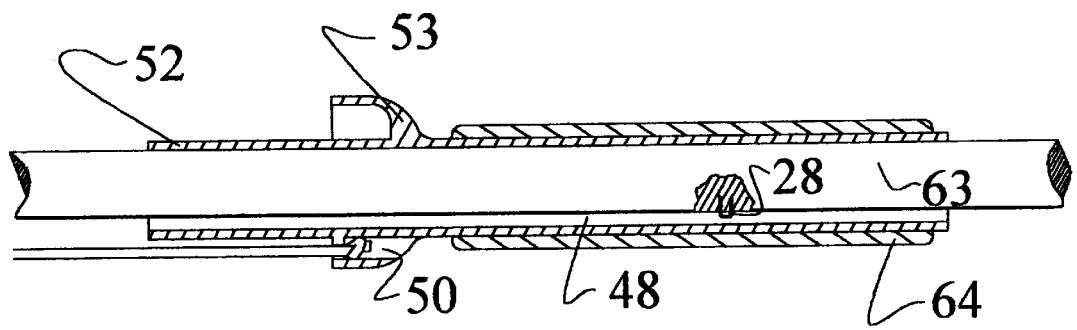
FIG. 8 is a sectional side view of a rake handle according to the invention, showing the grip portion.

FIG. 8 shows a grip 52, having an annular ring 53 serving as a hand guard and a cavity 50 to hide the rope 3 and to provide an anchor point for the rope. A co-linear slot 48 cooperates with a guide means 28, such as a pin, fixedly attached to or integral with the rake handle 63. Alternatively, a plurality of co-linear slots may be provided. The guide means maintains rectilinear motion of the grip 52 along the handle. The grip 52 may also have a comfort and/or grip enhancing means 64, for example in the form of a foam rubber sleeve. The grip 52 is placed at a suitable distance on the rake handle 63 from the rake head, to allow comfortable use of the rake.

FIG. 2, illustrates another form of reinforced rope anchor point 60 using increased size material, linear ribbing or integral trussing to prevent overstressing of the preferably plastic material. Likewise and in a similar way, traverse ribbing 58, formed of the rake head material across the dome 51 of the rake head socket, prevents the propagation of splits where the additional stresses of the modifications maybe to great for an unmodified plastic rake embodiment. Additional ribbing 54 may be required on each side of the rake handle socket dome 51, for retractor anchor points 59. A longitudinal internal rope guide passage 61, integrally shaped with the above described reinforcing, is located on the dome 51 of the rake head, extending to an opening adjacent to the fixed pulley 12, to provide a guide tube for the rope 3.

It will be appreciated that the above description relates to the preferred embodiments by way of example only. Many variations on the invention will be obvious to those knowledgeable in the field, and such obvious variations are within the scope of the invention as described and claimed, whether or not expressly described. For example, where tooling costs are no object, the pulley system could be placed at any selected part of the rake, even inside the handle or the grip.

What is claimed as the invention is:

1. A rake for raking and gripping debris, the rake comprising:

an elongate handle;

a rake head comprising a plurality of tines, said rake head being attached to one end of said elongate handle;

said rake head further comprising first and second elements arranged for gripping debris between them, at least one of said first and second elements being movable relative to the other of said first and second elements between an open position for raking, and to a gripping position in which said first and second elements can grip any debris between them;

a biasing means connected to each of the first and second elements which is movable, to bias each said moveable element towards said open position;

an elongate string means having one end operatively attached to at least one of said first and second elements for urging said elements to said gripping position, said string means extending upwardly along said handle for pulling by a rake user; and pulley means mounted on said rake, said elongate string means being routed over said pulley means to form a reeve, to thereby multiply a force applied to said element(s) by pulling said string means.

2. A rake for raking according to claim 1, wherein one of said first and second elements comprises a pivotable grapple attached to and pivotable about a fulcrum axis attached to said rake head, and wherein said biasing means urges said grapple towards the open position away from said rake head tines.

3. A rake according to claim 2, wherein said pulley means are attached to said rake head.

4. A rake according to claim 2, wherein said pulley means are attached to said rake handle.

5. A rake according to claim 2, wherein said pulley means are attached to said rake head and to said rake handle.

6. A rake according to claim 2, wherein the pulley means comprises a fixed pulley and a movable pulley, the fixed pulley being rotatably attached to the rake head and rotatable around said fulcrum axis, and the movable pulley being attached to the pivotable grapple, and wherein the elongate string means runs from said handle, over the movable pulley, around the fixed pulley, and to the rake head at a position towards a free end of the tines from said pulleys.

7. A rake according to claim 6, wherein the biasing means is a resilient rope.

8. A rake according to claim 6, wherein the fixed pulley is substantially covered by a shroud.

9. A rake according to claim 6, wherein the fixed pulley has a groove with a wider bottom portion than top portion.

10. A rake according to claim 6, wherein the movable pulley is mounted on a rigid brace attached to the grapple, and the movable pulley has two opposing large diameter sleeves providing a slot acting as a guide for the elongate string means.

11. A rake according to claim 2, further comprising a grip slidable along said handle, providing an anchoring point for the elongate string means, whereby sliding said grip enables a rake user to operate said movable element(s).

12. A rake according to claim 11, wherein said handle has guide means cooperating with at least one slot in said grip, whereby said grip slides linearly along said handle.

* * * * *